(12) United States Patent
Markunas et al.

(10) Patent No.: US 8,056,417 B2
(45) Date of Patent: Nov. 15, 2011

(54) TORQUE OSCILLATION MONITORING

(75) Inventors: Albert L Markunas, Roscoe, IL (US);
Vijay K Maddali, Rockford, IL (US)

(73) Assignee: Hamilton Sundstrand Corporation,
Windsor Locks, CT (US)

( * ) Notice: Subject to any disclaimer, the term of this patent is extended or adjusted under 35 U.S.C. 154(b) by 437 days.

(21) Appl. No.: 12/352,050

(22) Filed: Jan. 12, 2009

(65) Prior Publication Data
US 2010/0175478 A1     Jul. 15, 2010

(51) Int. Cl.
*G01D 9/00*     (2006.01)
(52) U.S. Cl. ............................ 73/650; 73/649
(58) Field of Classification Search .......... None
See application file for complete search history.

(56) References Cited

U.S. PATENT DOCUMENTS

| | | | | |
|---|---|---|---|---|
| 2,655,036 A | * | 10/1953 | Chapman | 73/650 |
| 2008/0245159 A1 | * | 10/2008 | Garshelis et al. | 73/862.27 |
| 2010/0286837 A1 | * | 11/2010 | Jiao et al. | 700/292 |
| 2011/0181045 A1 | * | 7/2011 | Letas et al. | 290/44 |

* cited by examiner

*Primary Examiner* — Andre Allen
(74) *Attorney, Agent, or Firm* — Stephen G. Mican

(57) ABSTRACT

A method of detecting and monitoring torsional oscillation in a mechanical coupling between a prime mover and a multiphase alternating current (AC) electrical generator, comprises the steps of: detecting in at least one received signal variations that are indicative of changes in the rotational speed of the electrical generator; extracting information from the detected variations that are indicative of torsional oscillation to produce a torsional oscillation signal that has information relating to at least the amplitude of the torsional oscillation; and monitoring the torsional oscillation signal to determine the presence and severity of the torsional oscillation in the mechanical coupling.

13 Claims, 2 Drawing Sheets

US 8,056,417 B2

TORQUE OSCILLATION MONITORING

FIELD OF THE INVENTION

The invention relates to the detection of torque oscillation in electro-mechanical power generating systems, and more particularly to monitoring torque oscillation in such systems.

BACKGROUND OF THE INVENTION

Electrical power generation systems powered by variable speed prime movers that require highly regulated electrical output, such as electrical power generation systems used for aeronautical applications, generally use a wound field synchronous machine (WFSM) that serves as an electrical generator. This is because it is easy to adjust rotor current to regulate electrical output of a WFSM. An electrical power generation system may alternatively use a regulated permanent magnet machine (PMM) that has a control coil. Current level in the control coil regulates output current of the PMM. A control coil current regulator system senses electrical output potential on a DC bus for the electrical power generation system with such a PMM and adjusts the current level in the control level to regulate the DC bus potential.

In any case, the electrical generator for an electrical power generation system requires a source of mechanical power, typically a prime mover that comprises a gas turbine engine, coupled to it so that it may convert the mechanical power into electrical power. Coupling is by way of a mechanical coupling that comprises at least a driveshaft, and more typically a reduction gearbox and driveshaft combination. For electrical power generation systems of a dual generator design, a requirement that a single failed generator that causes the shear of a driveshaft not propagate through the gearbox in such a manner as to result in a failure of the driveshaft for the other generator may constrain the mechanical torsional characteristics of the mechanical coupling. The inclusion of relatively soft generator input driveshafts may prevent such shaft shear propagation. However, because of this and other design constraints, the torsional resonant frequencies of the mechanical coupling can occur within the frequency range of an electrical potential regulation system for the electrical power generation system. Such mechanical coupling is subject to various torsional oscillations during operation of the electrical power generation system. During some operating conditions these torsional oscillations may persist, becoming sustained torsional oscillations (STOs). These STOs may lead to fatigue damage of the coupling and may cause catastrophic damage if undetected.

A co-pending patent application to Markunas et al., U.S. Ser. No. 11/824,659, filed 2 Jul. 2007 and having both common inventorship and ownership with this Application, describes an active damping system to detect and suppress STO by means of an STO signal detector that detects an STO signal in the generator output and a feedback loop that introduces a modulation of the generator control current that is out of phase with the detected STO signal to dampen the STO. This Application incorporates Markunas et al. by reference.

However, Markunas et al. does not address the function of actually indicating the presence of STO or measuring the torque magnitude of the STO, either as part of such a system to ascertain that the damping action functions properly or as a stand-alone STO monitoring system to measure STO and predict mean-time to failure (MTF) of the mechanical coupling arrangement based on the frequency and magnitude of the STO.

SUMMARY OF THE INVENTION

The invention generally comprises a method of detecting and monitoring torsional oscillation in a mechanical coupling between a prime mover and a multiphase alternating current (AC) electrical generator, comprising the steps of: detecting in at least one received signal variations that are indicative of changes in the rotational speed of the electrical generator; extracting information from the detected variations that are indicative of torsional oscillation to produce a torsional oscillation signal that has information relating to at least the amplitude of the torsional oscillation; and monitoring the torsional oscillation signal to determine the presence and severity of the torsional oscillation in the mechanical coupling.

DETAILED DESCRIPTION OF THE INVENTION

Figure 1:
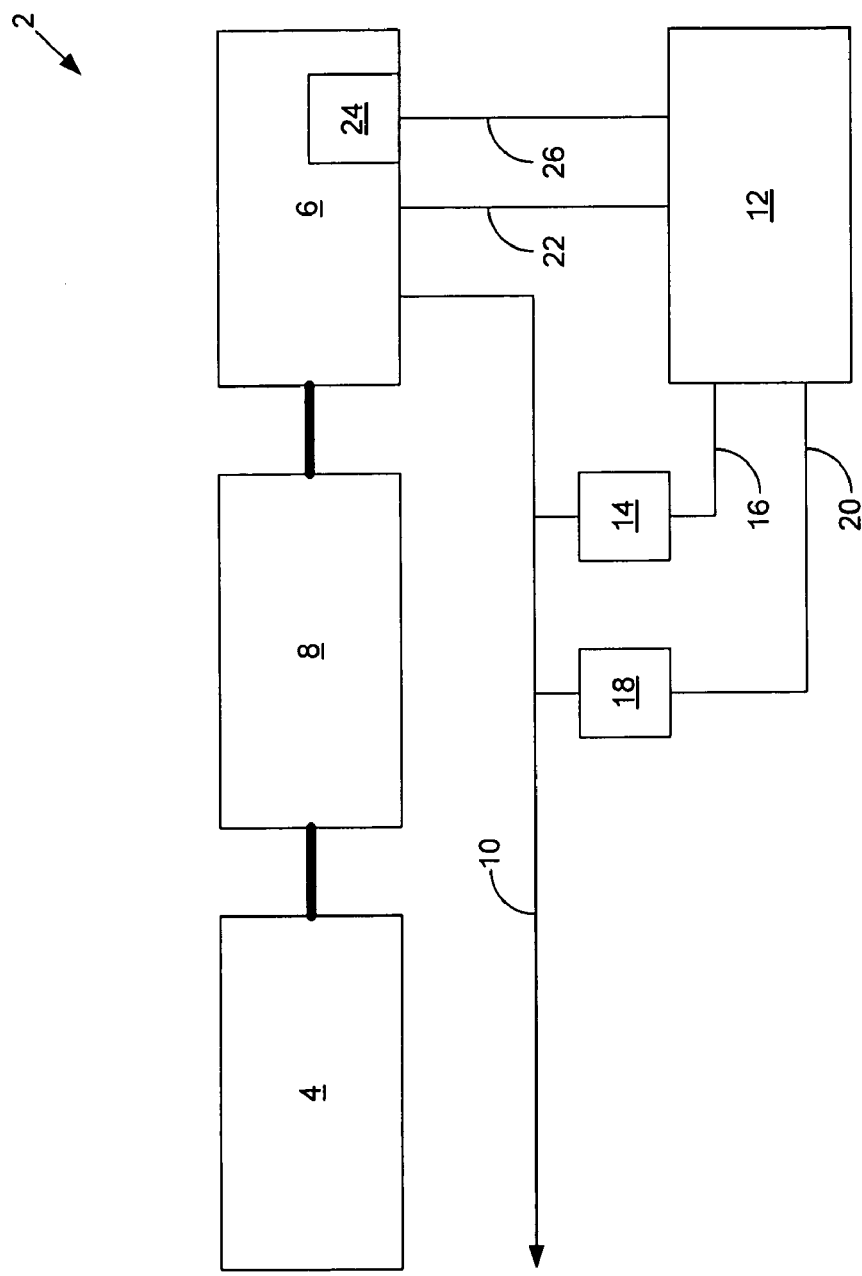
FIG. 1 is a generalised schematic diagram of a typical electrical generating system that is suitable for incorporating at least one possible embodiment of the invention.

FIG. 1 is a generalised schematic diagram of a typical electrical generating system 2 that is suitable for incorporating at least one possible embodiment of the invention. The generating system 2 has a prime mover 4 that supplies mechanical power to drive at least one multiphase alternating current (AC) generator 6 by way of a mechanical coupling 8. For example, in aeronautical applications, the prime mover 4 is generally a gas turbine engine, the generator 6 is a WFSM or a regulated PMM with a control coil and the mechanical coupling 8 is at least a driveshaft, and more commonly a gearbox/driveshaft combination.

The generator 6 develops electrical power on a main AC power bus 10. A generator control unit (GCU) 12 monitors the level of electrical potential and current on the power bus 10 by means of an electrical potential sensor 14 that develops a bus potential signal on a bus potential signal line 16 and a bus current sensor 18 that develops a bus current signal on a bus current signal line 20. It also sends a direct current (DC) generator control signal to the generator 6 by way of a generator control signal line 22. As the GCU 12 monitors the level of electrical potential and current on the power bus 10, it may change the level of the generator control signal on the generator control signal line 22 to maintain a constant predetermined level of electrical potential on the power bus 10.

If the generator 6 is a WFSM, the generator control signal is a DC exciter current signal. If the generator 6 is a regulated PMM with a control coil, the generator control signal is a DC control coil signal. In either case, the generator 6 may have an integral auxiliary generator 24 comprising an unregulated PMM that provides unregulated multiphase AC output power to the GCU 12 by means of an auxiliary power bus 26. The GCU 12 rectifies the AC power on the auxiliary power bus to DC to develop the generator control signal on the generator control signal line 22.

As described in Markunas et al., torsional oscillations cause changes in the rotational speed of the generator 6 that occur at the fundamental frequency of the torsional oscillations. It is possible to receive a signal that includes information relating to these variations in rotational speed of the generator 6, preferably within the GCU 12, and alter the generator control signal amplitude at the torsional oscillation fundamental frequency properly phased with respect to the torsional oscillation to dampen or suppress it. However, Markunas et al. does not describe any way of monitoring the level of torsional oscillation, either with or without implementation of such torsional oscillation control or active mechanical damping.

Figure 2:
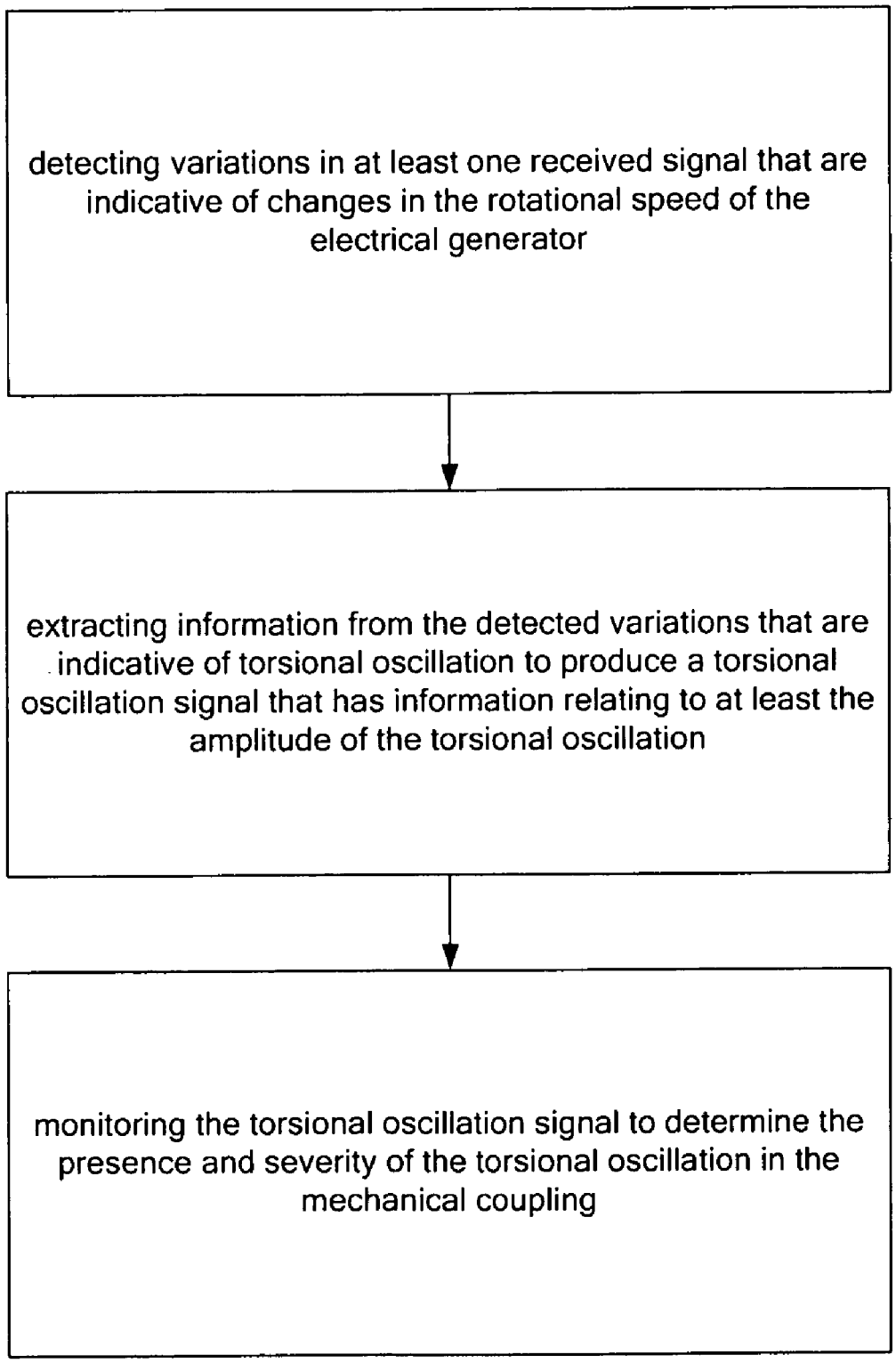
FIG. 2 is a flow chart for a method of detecting and monitoring torsional oscillation in a mechanical coupling between a prime mover and a multiphase alternating current (AC) electrical generator in the electrical generating system shown in FIG. 1 according to at least one possible embodiment of the invention.

FIG. 2 is a flow chart for a method of detecting and monitoring torsional oscillation in the mechanical coupling 8 between the prime mover 4 and the generator 6 in the electrical generating system 2 shown in FIG. 1 according to at least one possible embodiment of the invention. The first step of the method comprises detecting in at least one received signal variations that are indicative of changes in the rotational speed of the generator 6. For instance, the received signal may be a generator position signal from a position sensor (not shown) coupled to the generator 6. Alternatively, it may be at least one phase of the unregulated multiphase AC output power on the auxiliary power bus 26. It may also be the electrical potential signal on the bus potential signal line 16, the electrical current signal on the bus current line 20, or a combination thereof.

The second step of the method comprises extracting from the detected variations in the received signal that are indicative of the torsional oscillation information to produce a torsional oscillation signal that has information relating to at least the amplitude of the torsional oscillation. For instance, if the received signal is a generator position signal, the variations in speed indicated by the generator speed signal and the frequency at which these variations occur indicate the angular acceleration of the generator 6. If the received signal is at least one phase of the unregulated multiphase AC output power on the auxiliary power bus 26, the amplitude of the unregulated multiphase AC output power indicates the speed or frequency of the generator 6 and variations in the amplitude and the frequency at which these variations occur indicate angular acceleration of the generator 6. If the received signal is the electrical potential signal on the bus potential signal line 16, the electrical current signal on the bus current line 20, or a combination thereof, measuring the zero crossings rate, Luenberger state observation or Kalman filtration thereof indicates the speed or frequency of the generator 6 and variations in the indicated speed and the frequency at which these variations occur indicate angular acceleration of the generator 6. Since torque is the product of the effective moment of inertia and the angular acceleration, the torsional oscillation signal may then simply be the product of a constant and the indicated angular acceleration when the generator 6 is unloaded. An electrical load on the generator 6 increases this value by the torque that the load exerts on the rotor of the generator 6. Therefore, under load, the torsional oscillation signal may be the product of a constant and the indicated angular acceleration added to a variable that represents estimated electrical loading of the generator 6.

This extraction step may also include high pass filtering of the torsional oscillation signal to remove any signal content below expected torsional oscillation frequencies that may be due to other factors, such as variations in mechanical energy of the engine 4. This extraction step may also include compensating the amplitude and phase of the torsional oscillation signal for system-induced amplitude and phase shift to more accurately indicate estimated torque in the mechanical coupling 8.

The third step of the method comprises monitoring the torsional oscillation signal to determine the presence and severity of torsional oscillations in the mechanical coupling 8. This step may include the steps of monitoring the duration that the torsional oscillation signal amplitude remains above a predetermined threshold amplitude for and generating a warning signal when the monitored duration exceeds a predetermined length of time that indicates the presence of potentially dangerous torsional oscillations in the mechanical coupling 8, and optionally initiating a sequence of predetermined steps to alleviate the indicated dangerous level of sustained torsional oscillations that sheds electrical loads to the affected generator 6 or even dropping the affected generator 6 off line. This step may also include the steps of recording the duration of torsional oscillations above several predetermined torque thresholds as indicated by the torsional oscillation signal and comparing the recorded duration to a table of estimated mechanical fatigue as a function of torsional oscillation amplitude and duration to monitor estimated life of the mechanical coupling. This latter step requires the monitoring the frequency of the torsional oscillation in addition to the amplitude in order to estimate the number of cycles for fatigue life estimation of the mechanical coupling 8.

The described embodiments of the invention are only some illustrative implementations of the invention wherein changes and substitutions of the various parts and arrangement thereof are within the scope of the invention as set forth in the attached claims.

The invention claimed is:

1. A method of detecting and monitoring torsional oscillation in a mechanical coupling between a prime mover and a multiphase alternating current (AC) electrical generator, comprising the steps of:
   detecting in at least one received signal variations that are indicative of changes in the rotational speed of the electrical generator;
   extracting information from the detected variations that are indicative of torsional oscillation to produce a torsional oscillation signal that has information relating to at least the amplitude of the torsional oscillation; and
   monitoring the torsional oscillation signal to determine the presence and severity of the torsional oscillation in the mechanical coupling.

2. The method of claim 1, wherein the step of detecting variations in at least one received signal comprises detecting variations in a received generator position signal.

3. The method of claim 1, wherein the step of detecting variations in at least one received signal comprises detecting variations in a received generator output signal.

4. The method of claim 3, wherein the received generator output signal is an unregulated auxiliary permanent magnet machine (PMM) signal.

5. The method of claim 4, wherein the step of extracting information from the detected variations in the received signal comprises detecting the amplitude of the unregulated auxiliary PMM signal.

6. The method of claim 3, wherein the step of detecting variations in at least one received signal comprises detecting zero crossings of at least one phase of the electrical generator output and the step of extracting information from the detected variations in the received signal comprises the step of measuring the zero crossings rate to produce the torsional oscillation signal.

7. The method of claim 3, wherein the step of detecting variations in at least one received signal comprises detecting electrical potential and current levels in at least one phase of the electrical generator output.

8. The method of claim 7, wherein the step of extracting information from the detected variations in the received signal comprises the step of analysing the detected electrical potential and current levels in at least one phase of the electrical generator output by way of Luenberger state observation to produce the torsional oscillation signal.

9. The method of claim 7, wherein the step of extracting information from the detected variations in the received signal comprises the step of analysing the detected electrical potential and current levels in at least one phase of the electrical generator output by way of Kalman filtration to produce the torsional oscillation signal.

10. The method of claim 1, wherein the step of extracting information from the detected variations in the received signal torsional oscillation to produce a torsional oscillation signal that has information relating to at least the amplitude of the torsional oscillation comprises the step of high pass filtering the torsional oscillation signal to remove any signal content below expected torsional oscillation frequencies.

11. The method of claim 1, wherein the step of extracting information from the detected variations in the received signal indicative of torsional oscillation to produce a torsional oscillation signal that has information relating to at least the amplitude of the torsional oscillation comprises the step of compensating the amplitude and phase of the torsional oscillation signal for amplitude and phase shift to more accurately indicate estimated torque in the mechanical coupling.

12. The method of claim 1, wherein the step of monitoring the torsional oscillation signal to determine the presence and severity of torsional oscillation comprises the steps of monitoring the duration that the torsional oscillation signal amplitude remains above a predetermined threshold amplitude and generating a warning signal when the monitored duration exceeds a predetermined length of time that indicated the presence of potentially dangerous torsional oscillations in the mechanical coupling.

13. The method of claim 1, wherein the step of extracting information from the detected variations that are indicative of torsional oscillation to produce a torsional oscillation signal that has information relating to at least the amplitude of the torsional oscillation extracts angular acceleration of the generator from detected variations in the indicated speed and the frequency at which these variations occur to produce the torsional oscillation signal.

* * * * *